United States Patent [19]

Hestad et al.

[11] 4,346,261
[45] Aug. 24, 1982

[54] SPEAKER PHONES

[75] Inventors: Alfred M. Hestad; Levi L. Rose, both of Chicago, Ill.

[73] Assignee: United Networks, Inc., Chicago, Ill.

[21] Appl. No.: 130,847

[22] Filed: Mar. 17, 1980

[51] Int. Cl.³ .............................................. H04M 9/08
[52] U.S. Cl. .............................. 179/1 HF; 179/81 B
[58] Field of Search ............... 179/1 HF, 1 VC, 1 FS, 179/1 SW, 81 B, 170.8

[56] References Cited
U.S. PATENT DOCUMENTS 3,751,602  8/1973  Breeden ........................ 179/1 HF
4,115,658  9/1978  Williams ........................ 179/1 HF Primary Examiner—Joseph A. Popek
Attorney, Agent, or Firm—Alter and Weiss

[57] ABSTRACT

A speaker telephone system having hands-free telephone sets with microphones and loud-speakers and including circuitry for preventing feedback between the loud-speakers and the microphones in both the transmitting and receiving modes by automatically controlling the amplification of the signals coming from the microphones and going to the loud-speakers, as a function of the signal direction, while still maintaining the microphones and loud-speakers electrically coupled to the telephone lines.

15 Claims, 3 Drawing Figures

SPEAKER PHONES

FIELD OF THE INVENTION

The present invention is concerned in general with telephone subscriber stations; and more particularly, with hands-free type speaker telephone systems.

BACKGROUND OF THE INVENTION

Speaker telephones have several definite advantages over the conventional telephone instruments. For example, the hands of the user of the speaker phone are free to perform functions other than holding a telephone handset. Also, the speaker phone enables a plurality of parties to simultaneously fully participate in telephone conversations over the single speaker phone.

Unfortunately, the prior art, presently available speaker phones suffer severe shortcomings caused by the unavoidable accoustical and electrical coupling between the microphones and the loud-speakers of the speaker phones. When incoming, received voice signals are amplified to drive the loud-speaker, the accoustical output of the loud-speaker is sensed by the microphone and returned to the telephone line as positive accoustical feedback, causing oscillations or "howling" at the receiving loud-speaker. In addition, the sensed signal is transmitted to the distant party, causing an unpleasant "echo" that simulates talking in a barrel.

The signals that originate at the microphone for transmission to the distant party over the telephone lines are at least partially electrically coupled back to the loud-speaker; and therefore, then also accoustically coupled back to the microphone. This feedback also may cause oscillation with the consequent noise and distortion of the outgoing signal.

The prior art uses many electrical systems to attempt to overcome the problems caused by the accoustical coupling of the loud-speaker and the microphone. The different systems are not always used exclusively.

Some of the more widely used systems are "cancellation", "switching" (i.e., the speakers and microphones are switched on and off separately and exclusively, whereby when the speaker is used, the microphone is "dead" and vice versa), and by "gain control"; i.e., by reducing the gain at the receiving end and the emitting end to prevent the troublesome and interferring oscillations.

Examples of the prior art attempted solutions are discussed and explained, for example, in U.S. Pat. Nos. 3,889,058 ("switching"), 3,975,588 (discussion of "cancellation"), 3,922,488 ("cancellation", "gain control " and "switching") and 4,052,562 ("switching").

Each of the prior art attempts at finding a solution to the "accoustical feedback" problem has certain shortcomings. The use of "cancellation" has not proved successful, since complete cancellation is not possible, because of such things as varying line impedance.

The "switching" solution prevents "simultaneous" conversation; and therefore, is inherently unnatural.

"Gain control" attempts have largely floundered, because equipment for accurately determining the source or direction of the signals; i.e., are the signals "incoming" or "outgoing", have been lacking. Therefore, in the prior art systems, either the gain was muted at the wrong time, or wasn't reduced when reduction was necessary.

Accordingly, an object of the present invention is to provide speaker telephones which include circuitry that successfully and economically eliminate problems arising from the accoustical and/or electrical coupling of the microphone and the loud-speaker.

A related object of the present invention is to provide circuitry for determining the "direction" of signals in duplex equipment, such as speaker telephones.

Another and related object of the present invention is to provide circuitry to cancel signals originating in the transmitting transducer (microphone) prior to the arrival of such signals at the receiving transducer (loud-speaker) without interfering with the transmission of those signals over the telephone lines.

Another object of the present invention is to keep the microphone and loud-speaker amplifiers operative, but to reduce the signal output of the microphone amplifier means during the receive mode and to reduce the signal output of the loud-speaker amplifier means during the transmit mode, with the modes determined by the direction determining means.

Still another object of the present invention is provide signal level detector means for use in controlling the signal level reducing means.

Another object of the present invention is to provide telephone loud-speaker systems effectively using cancellation, as well as shunt means, for controlling the output of the loud-speaker and the microphone suppliers, responsive to the direction of the signals and to the level of the signals with the circuitry powered from the telephone lines.

Yet a further related object of the present invention is to control the amplifier shunts with protective timing circuits to prevent and reduce noises, such as clicking noises.

SUMMARY OF THE INVENTION

The above-mentioned and other objects and features of the present invention are achieved in a preferred embodiment of a speaker phone system having microphones and a loud-speaker. The speaker phone includes circuitry for providing feedback between the microphones and the loud-speakers by determining the direction of the signals, cancelling the signal from the microphone (transmitted or outgoing signal) on its path to the loud-speaker, but leaving it intact on its path to the telephone lines. The level of the signal going to the loud-speaker is determined and circuits are controlled to automatically shunt either the microphone or the loud-speaker amplifier as a function of the determined signal level and/or the signal direction (i.e., outgoing or incoming). The shunt, in conjunction with the cancellation, reduces the signal from the loud-speaker to minimal levels, while enabling good receiving circuit levels without the shunt. The circuitry enables simultaneous conversation without any detrimental oscillations or "echo" due to feedback and the microphone.

BRIEF DESCRIPTION OF THE DRAWINGS

The operation and the utilization of the present invention will be more fully apparent from the description of a preferred embodiment taken in conjunction with the following drawings, in which.

GENERAL DESCRIPTION

Figure 1:
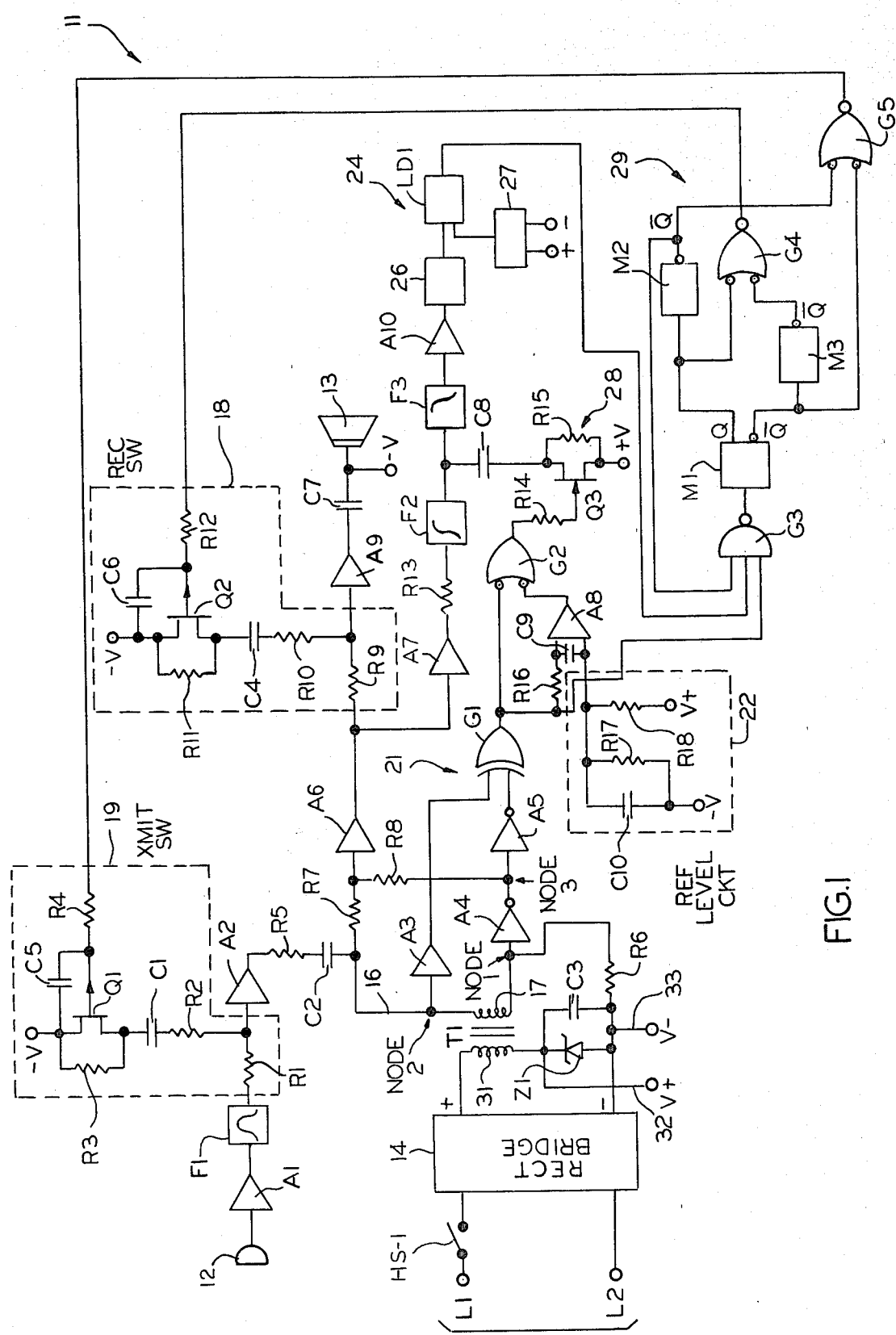
FIG. 1 is a simplified block diagram showing of the speaker phone circuitry.

The speaker phone shown generally in block diagram form in FIG. 1 includes a transmitting signal generating transducer or microphone 12 and a receiving signal transducer or loud-speaker 13. The telephone lines shown as L1, L2 are coupled to the speaker phone circuitry through hook switch contacts represented as HS-1, rectifier bridge 14 and transformer T1.

The microphone is shown coupled to transformer T1 over a transmit path that includes amplifier A1, audio band pass filter F1, coupling resistor R1, amplifier A2, a coupling circuit including resistor R5 and capacitor C2, and conductor 16 to the top of the secondary winding 17 of transformer T1.

A resistor R6 couples the bottom of winding 17 to the negative junction of the rectifier bridge 14. Speech signals coupled via transformer T1 generate a voltage across resistor R6.

For descriptive purposes, the junction of resistor R6 and winding 17 is labeled NODE 1, while the top of winding 17 of the junction of winding 17 and conductor 16 is labeled NODE 2. When the signal on winding 17 originates at the microphone 12 (outgoing speech signals) then the voltages at NODE 1 and NODE 2 are in phase.

The telephone lines are coupled to the loud-speaker over a circuit that includes hook switch contacts HS-1, rectifier bridge 14, transformer T1, conductor 16, resistor R7, amplifier A6, resistor R9, amplifier A9 and capacitor C7 to loud-speaker 13.

Note that the transmitting (outgoing) path and the receiving (incoming) path are joined at NODE 2, which is also the junction of capacitor C2, resistor R7 and conductor 16. Thus, the microphone and the loud-speaker are ostensibly electrically coupled.

Means are provided for electrically uncoupling the microphone and the loud-speaker. In greater detail, inverter amplifier A4 is connected to NODE 1. The output of the inverter amplifier A4 is labeled NODE 3 to aid in the description of the operation of the circuitry. The signal at NODE 3 is 180 degrees out of phase with the signal at NODE 1; and hence, also 180 degrees out of phase with the transmitted signal at NODE 2.

It should be noted that the received signals at NODES 1 and 2 are approximately 180 degrees out of phase. Thus, the received signal at NODE 3 is approximately in phase with the received signal at NODE 2.

The signal from NODE 3 is coupled through resistor R8 to the junction of resistor R7 and amplifier A6. The proper selection of resistors R7 and R8 enables the cancellation of most of the outgoing signals appearing at the input to amplifier A6. The incoming signal is also reinforced at the input to amplifier A6.

As with all cancellation circuits, the cancelling is not 100% effective. In this case, the line impedance is one of the factors determining the voltage at NODE 1; thus, since the line impedance varies, the cancelling can't be 100% effective.

Means are provided for shunting unwanted microphone signals that escape cancellation before they affect the loud-speaker 13. More particularly, the output of amplifier A6, which, as previously noted, is coupled through resistor R9 to the input of amplifier A9, is selectively shunted by receiver switching means 18 before reaching amplifier A9. The receiver switching means 18 also effectively varies the gain of the loud-speaker amplifier means and includes resistor R10 joined to the junction of resistor R9 and the input of amplifier A9. The other side of resistor R10 extends through coupling capacitor C4 and FET transistor Q2 to negative voltage.

When the FET transistor Q2 is switched on, the gain of the loud-speaker amplifier means is effectively lowered and the remaining outgoing signal is practically completely eliminated in the loud-speaker circuitry before reaching amplifier A9; and therefore, does not activate the loud-speaker 13.

The resistor R11 connected across the transistor Q2 prevents a D.C. voltage build up on capacitor C4; while transistor Q2 is switched off. Such a voltage build up would cause "clicks", when the transistor switched.

Means are provided for decreasing the gain of the outgoing signal amplifier means. More particularly, a transmitting switching circuit 19 is provided which comprises resistor R2 coupled to the junction of resistor R1 and the input of amplifier A2. The other side of resistor R2 is coupled through capacitor C1 and FET transistor Q1 to negative voltage. The outgoing signal is thus shunted to negative voltage, when the transistor Q1 is switched to the conducting state. The resistor R3 acts as does resistor R11 in the receiving switching circuit to prevent "clicking" noises by preventing the build up of voltage on capacitor C1, while transistor Q2 is not conducting.

The transmit and receive switching means vary the output or gain of the transmitting and receiving amplifier means, respectively. The switching means are actuated to conduct and shunt at least a portion of the transmit and receive signals, respectively, to negative voltage, for example, responsive to whether the signals at transformer T1 are outgoing or incoming.

Means are, therefore, provided for detecting the direction of the speech signals. More particularly, a speech direction detecting circuit 21 is provided and comprises amplifier A3, inverter amplifiers A4 and A5 and exclusive OR gate G1.

In the transmit mode, when the signal at transformer T1 is outgoing, the speech signal at NODE 2 is coupled via amplifier A3 to one input of the exclusive OR gate G1. The speech signals at NODE 1 are coupled through the inverter amplifiers A4, A5 to the other input of gate G1. The amplifiers convert the speech signals to square waves. Since the signals at NODE 1 and NODE 2 are in phase, the input signals at the inputs of gate G1 are in phase and the output of that gate is low.

In the receive mode, when the signal at transformer T1 is incoming, the inputs to gate G1 are out of phase, therefore, high. Thus, a low output from gate G1 indicates outgoing signals and a high output indicates incoming signals.

Figure 2:
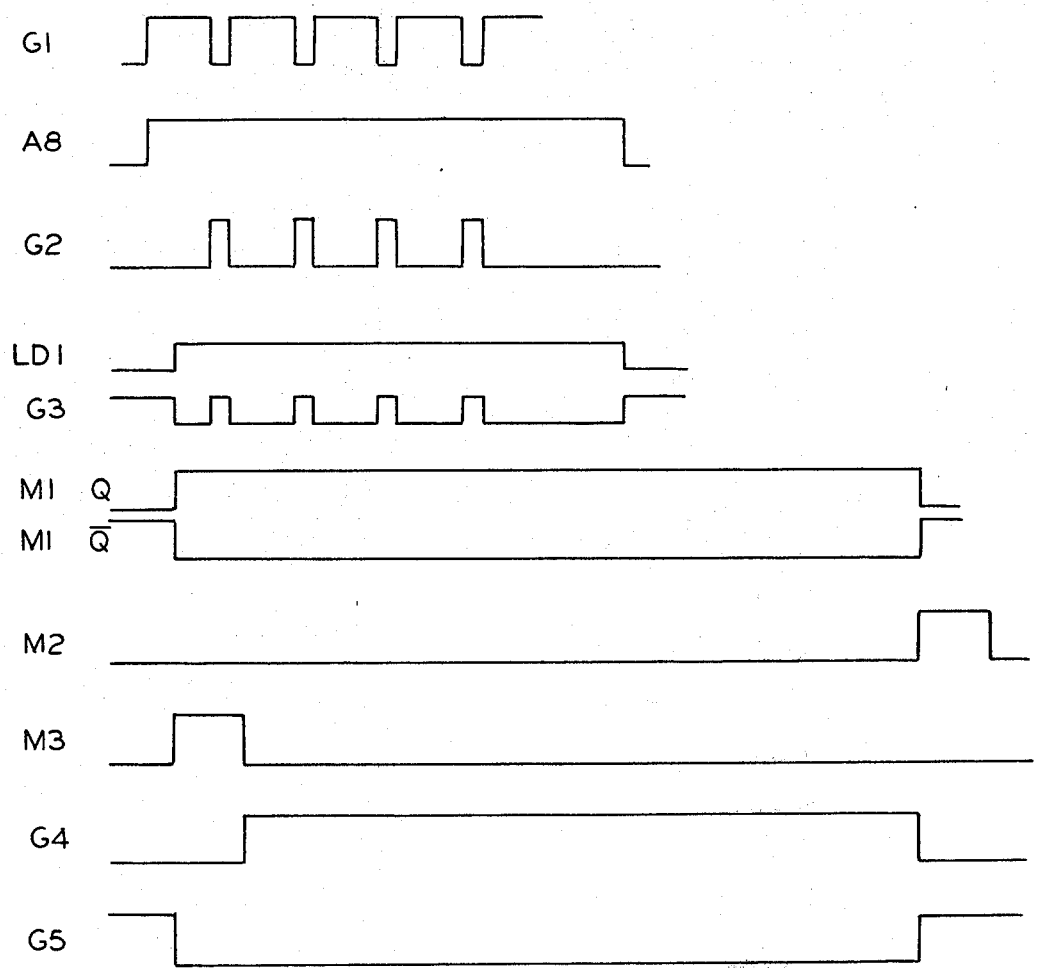
FIG. 2 is a timing diagram of various circuits, shown in the block diagram, responsive to incoming speech signals from the telephone lines.
Figure 3:
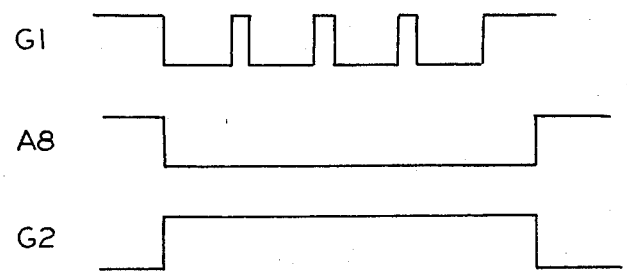
FIG. 3 is a timing diagram of various circuits shown in the block diagram, responsive to outgoing speech signals to the telephone lines.

The telephone lines cause some phase shift in the input signals to gate G1. Therefore, those signals are not exactly in phase, causing positive going spikes to appear on the output of gate G1 in the outgoing mode, and negative going spikes on the output of gate G1 in the incoming mode. See, for example, the timing diagrams showing the output of gate G1 in FIGS. 2 and 3.

Means are provided for eliminating these spikes. More particularly, the output of gate G1 is coupled via resistor R16 to one input of differential level detector A8. The other input of the detector A8 is coupled to a reference level circuit 22. The reference level circuit comprises resistor R17 shunted by capacitor C10 for connecting negative voltage to the input and resistor R18 (substantially equal to resistor R17) for connecting positive voltage to the input, thereby assuring a low input.

A capacitor C9 across the inputs of detector A8 absorbs the spikes causing the outout of detector A8 to be a steady high for incoming speech and a steady low for outgoing speech. (See FIGS. 2 and 3)

Means are provided for determining the level of the signal in the loud-speaker amplifier means. More particularly, signal level detecting circuitry 24 is provided which comprises buffer amplifier A7 with its input coupled to the junction of the output of amplifier A6 and resistor R9. The output of amplifier A7 is connected through coupling resistor R13, high pass filter F2, low pass filter F3 amplifier A10, rectifier and integrator circuit 26 to one input of D.C. level detector LD1. The other input of D.C. level detector LD1 is coupled to a reference level circuit 27 similar to circuit 22.

Means are provided for shunting the level determining circuit 24 to positive voltage. More particularly, level determining switching means 28 is provided and comprises FET transistor Q3 coupled through capacitor C8 between the junction of high pass filter F2, low pass filter F3 and positive voltage. A resistor R15 prevents a voltage build up on capacitor C8, while transistor Q3 is in the non-conducting state.

Transistor Q3 is switched responsive to the output of gate G2, which is coupled thereto through resistor R14. The output of gate G2 goes high responsive to a low signal at either of the inputs and low responsive to high signals at both of its inputs. Since the output of detector A8 is low during outgoing speech, the output of gate G2 is a steady high during outgoing speech. (See FIG. 3) Thus, during outgoing speech, transistor Q3 is steady on, causing the output of level detector LD1 to stay low.

Means are provided for controlling the receive and transmit switching means responsive to the outputs of the level detecting circuit 24 and/or the output of the direction detecting circuit 21. More particularly, control circuit means 29 is provided comprising gate G3 which controls timing circuits M1, M2 and M3, that in turn control gates G4 and G5 whose outputs switch transistors Q2 and Q3, respectively.

Gate G3 has three inputs. One input is connected to the output of gate G1, another input is connected to the output of D.C. level detector LD1, while the other input is coupled to the output of the timing circuit M2, a monostable timer providing a low ten millisecond signal. Gate G3 is an inverting AND gate. Thus, if any of the signals on its input go low, its output goes high. While all inputs are high, its output remains low. When its output remains high, timing circuit M1 can't be triggered. During the transmitting state, the output of LD1 is steady low. The output of gate G3 is, therefore, high.

When an incoming signal is received at the transformer T1, then the output of gate G1 goes high as do the outputs of detector LD1 responsive to transistor Q3 being switched off by the low signal from gate G2. (See timing diagram FIG. 2) The low output from gate G3 triggers timing circuit M1 to provide 200 millisecond high and low signals at terminals Q and $\overline{Q}$, respectively. The low signal from the $\overline{Q}$ terminal of circuit M1 triggers a ten millisecond low signal from timing circuit M3. The $\overline{Q}$ terminal of circuit M1 also provides a 200 millisecond low to OR gate G5. Gate G5, therefore, provides a low output which turns on transistor Q1 to mute the microphone circuit.

The Q terminal of circuit M1 also provides a high to OR gate G4. Gate G4 receives a high after ten milliseconds from timer circuit M3. Therefore, its output goes high after ten milliseconds. The high output switches off transistor Q2, increasing the gain of the loud-speaker amplifier. However, timer M1 remains switched for at least its 200 millisecond period. The output of gate G5 remains low, because of the low signal it receives from circuit M1.

After 200 milliseconds, if there is no new incoming signal, the outputs of circuit M1 return to normal; i.e., a low at terminal Q and a high at terminal $\overline{Q}$. The low at terminal Q switches timer M2 on to provide a low at its output for ten milliseconds. That low maintains gate G5's output low for an additional ten milliseconds. Thus, the M2 timer assures that the transmit gain is not increased until about ten milliseconds after the receive gain has been reduced (timing guard period). Similarly, the M3 timer assures that the receive gain is not increased until ten milliseconds after the transmit gain is reduced. The guard period prevents "squealing" which would otherwise occur during the changeover.

Means are provided for powering the speaker phone circuit from the telephone lines. More particularly, a zener diode Z1 bridged by filter capacitor C3 is coupled from the bottom of the primary winding 31 of transformer T1 to the negative terminal of rectifier bridge 14. The top of winding 31 is coupled to the positive terminal of rectifier bridge 14. A lead 32 is coupled to the junction of zener diode Z1 and winding 31 to provide positive voltage. A lead 33 is coupled to the bottom of zener Z1 to provide negative voltage.

The connections between gates G4, G5 and switching circuits 18 and 19, respectively, is accomplished through timing circuits including resistor R12, capacitor C6 and resistor R4, capacitor C5, respectively. The timing circuits act to prevent noises, such as "clicks" during changeover.

Thus, the circuit provides for cancellation of transmitted signals appearing in the receive circuit, automatically increases and decreases the gains of the incoming and outgoing circuit amplifiers responsive to signal direction and/or level. The circuit also provides effective timing guards and formally, effectively eliminates oscillations and "echo" in speaker phone systems.

While the principles of the invention have been described above in connection with specific apparatus and applications, it is to be understood that this description is made by way of example only and not as a limitation on the scope of the invention.

What is claimed is:

1. A speaker telephone system having telephone sets with microphone means for generating outgoing signals and loud-speaker means for transducing incoming signals to sound waves, including circuitry for preventing unwanted feedback between the loud-speaker means and the microphone means during the receiving of signals from telephone lines and transmitting of signals to telephone lines, said circuitry including:
   first amplitude varying means for varying the amplitude of the signals from the microphone means;
   second amplitude varying means for varying the amplitude of the signals to the loud-speaker means;
   coupling means attached at a first end to said telephone sets and at a second end to the telephone lines for coupling each telephone set to the telephone lines;

direction determining means for determining the incoming or outgoing nature of electrical signals appearing at said first end of said coupling means; and control means for controlling said first and second means responsive to the output of said direction determining means.

2. The speaker telephone system of claim 1 wherein said direction determining means utilizes differing phase characteristics of said incoming signals and said outgoing signals at said first end of said coupling means to determine the incoming or outgoing nature of such signals.

3. The speaker telephone system of claim 2 wherein said direction determining means includes comparative gate means, said outgoing signals being substantially in phase at two separate nodes on said first end of said coupling means, said incoming signals being substantially out of phase at said two separate nodes, means for individually coupling the signals appearing at said two separate nodes to said comparative gate means, whereby the individual inputs applied to said comparative gate means are substantially equal for said outgoing signals and substantially differing for said incoming signals.

4. The speaker telephone system of claim 3 wherein said system further comprises;

level detector means;

said level detector means producing a first constant output when an applied signal is predominantly greater than a predetermined level, and producing a different second constant output when said applied signal is predominantly lower than said predetermined level;

means for coupling the output of said comparative gate means to said level detector means; and means for connecting the output of said level detector means to said control means to operate said control means responsive to the output of said level detector means.

5. The speaker telephone system of claim 3 wherein said comparative gate means comprises exclusive OR gate means for determining the incoming or outgoing nature of said signals.

6. The speaker telephone system of claim 1 wherein said system further includes outgoing amplifying means and incoming amplifying means for amplifying said outgoing and incoming signals, respectively, said first and second amplitude varying means including first switching means for shunting said outgoing amplifying means and second switching means for shunting said incoming amplifying means.

7. The speaker telephone system of claim 6 wherein said control means includes timing means to assure that said first and second switching means are switched on in a mutually exclusive fashion at different times.

8. The speaker telephone system of claim 7 wherein said control means assures that there is a time interval between the turning off of one of said switching means and the turning on of the other of said switching means.

9. The speaker telephone system of claim 6 including cancelling means for cancelling signals originating at said microphone means and existing on a common conductor, said common conductor being coupled by transmitting circuitry including said outgoing amplifying means to said microphone means, said common conductor being also coupled by receiving circuitry including said incoming amplifying means to said loud-speaker means.

10. The speaker telephone system of claim 9 wherein said cancelling means includes inverter means for inverting said signal from said microphone means, and means for using the inverted signal to substantially cancel signals originating at the microphone means and existing on said common conductor, to prevent said signals from activating said loud-speaker means.

11. A speaker telephone system with speaker phones having transmitting and receiving circuitry for sending and receiving outgoing and incoming signals, respectively, over telephone lines, said circuitry including:

means for cancelling outgoing signals prior to said outgoing signals transversing said receiving circuitry, while maintaining said transmitting and receiving circuitry electrically connected to said telephone lines and to each other;

means for coupling said transmitting and receiving circuitry to said telephone lines;

direction determining means for determining the incoming or outgoing nature of electrical signals appearing at said coupling means;

outgoing signal amplifier means for amplifying the outgoing signals;

incoming signal amplifier means for amplifying the incoming signals; and means responsive to said direction determining means for varying the gain of the incoming and outgoing amplifier means, whereby simultaneous conversation can occur, even when the gain is substantially reduced.

12. The speaker phone system of claim 11 wherein said cancelling means and said direction determining means operatably share common elements.

13. A system for determining speech direction in duplex circuits wherein signals occur in first and second directions, said system including component means wherein said signals in said first direction are in phase at two separate nodes in said component, while signals in said second direction are out of phase at said two separate nodes, and gate means having inputs connected to said first and second nodes for providing high outputs responsive to the out-of-phase signals at the inputs to said gate means and low outputs responsive to the in-phase signals at the inputs of said gate means.

14. The system of claim 13 wherein said component means comprises transformer means.

15. The system of claim 14 wherein said transformer means includes a secondary winding, said gate means comprising exclusive OR gate means coupled to said nodes, said first node being one output terminal of said secondary winding, and said second node being the other output terminal of said secondary winding.

* * * * *